United States Patent [19]

Miyagawa

[11] 4,384,812

[45] May 24, 1983

[54] SCREW AND SCREW FORMING TOOL

[75] Inventor: Einosuke Miyagawa, Osaka, Japan

[73] Assignee: Miyagawa Kinzoku Kogyo Company Limited, Osaka, Japan

[21] Appl. No.: 135,452

[22] Filed: Mar. 31, 1980

[30] Foreign Application Priority Data

Apr. 3, 1979 [JP] Japan .................. 54/40524

[51] Int. Cl.³ .............................................. F16B 23/00
[52] U.S. Cl. .................................. 411/410; 10/26; 81/121 R; 81/436; 411/403
[58] Field of Search ............ 411/402, 403, 404, 405, 411/406, 407, 408, 409, 410; 10/26, 7; 81/121 R, 436

[56] References Cited

U.S. PATENT DOCUMENTS

| | | | |
|---|---|---|---|
| 2,083,092 | 6/1937 | Richer | 411/403 |
| 2,914,984 | 12/1959 | Ansingh | 411/403 |
| 3,190,169 | 6/1965 | Rosan | 411/403 |
| 3,400,626 | 9/1968 | Bergere | 411/405 |
| 3,604,305 | 9/1971 | Dreger | 411/403 |
| 3,656,397 | 4/1972 | Kudelko | 411/408 |

FOREIGN PATENT DOCUMENTS

| | | | |
|---|---|---|---|
| 1009061 | 2/1952 | France | 411/403 |
| Ad.78328 | 2/1962 | France | 411/402 |

*Primary Examiner*—Thomas J. Holko
*Attorney, Agent, or Firm*—Armstrong, Nikaido, Marmelstein & Kubovcik

[57] ABSTRACT

A screw having a star-shaped socket hole in the top surface of the screw head in the form of two equilateral octagons which are disposed between a regular octagon and a regular square inscribed in the regular octagon and which are placed one upon another in concentric and out-of-phase relation with a phase shift of about 45° so that there are eight convex regions which alternate with eight concave regions. A tool for forming the same is also disclosed.

6 Claims, 27 Drawing Figures

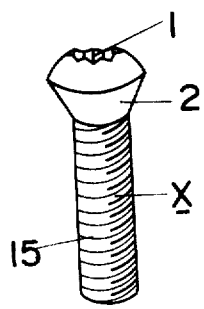
Fig 15
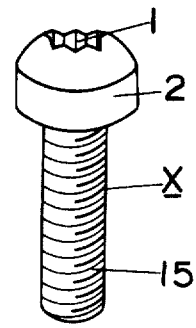
Fig 16
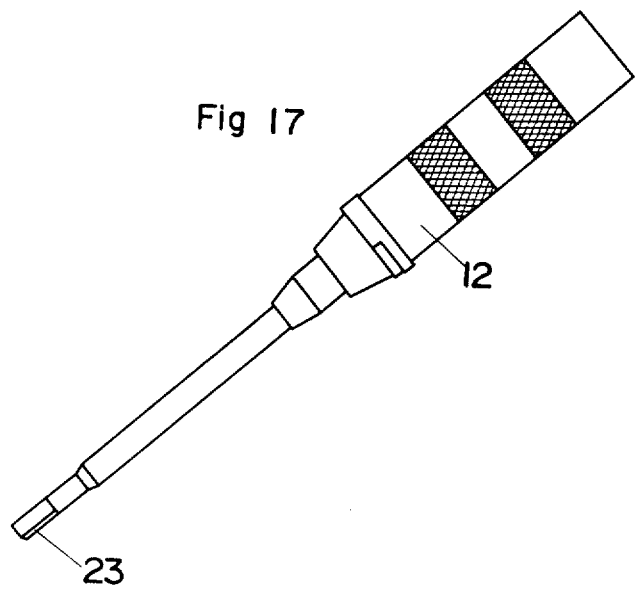
Fig 17
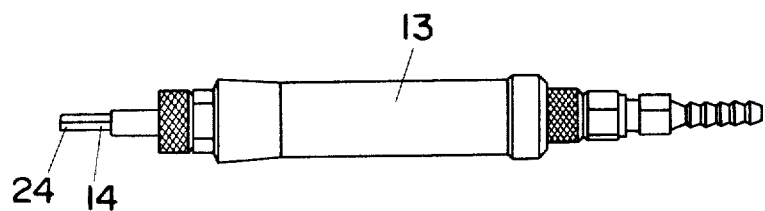
Fig 18
Fig 19(a)
Fig 19(b)
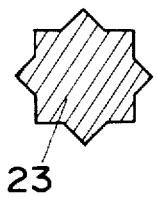

SCREW AND SCREW FORMING TOOL

The present invention relates to a screw having a star-shaped socket hole in the top surface of the screw head, and a tool for forming such screws. More particularly, the invention relates to a screw characterized in that the top surface of a screw head (2) is formed with a star-shaped socket hole (1) in the form of a plurality of equilateral octagons (C) which are disposed between a regular octagon (A) and a regular square (B) inscribed in said regular octagon (A) and which are placed one upon another in concentric and out-of-phase relation. It also relates to a screw forming tool characterized in that said tool comprises a punch whose end surface is formed with a star-shaped projection (3) in the form of a plurality of equilateral octagons (C) which are disposed between a regular octagon (A) and a regular square (B) inscribed in said regular octagon (A) and which are placed one upon another in concentric and out-of-phase relation.

Heretofore, as found in U.S. Pat. No. 2,397,216, a socket hole 1' formed in the top surface of the screw heads 2' of a screw X' has in most cases been a hexagonal hole, as shown in FIG. 1, which makes it impossible to obtain high tightening torque values. Alternatively, as found in U.S. Pat. No. 2,914,984, the use of a square socket hole 1', as shown in FIG. 2, provides increased tightening torque values but such square socket hole is not very practicable because of its poor operating performance in that whereas the tightening angle required by the hexagonal hole is 60°, that required by the square hole is 90°. Further, the hexagonal and square socket holes 1' are used for heavy screws and their operating performance has been poor because no consideration has been given of sticking (which refers to the feature by which a screw held at the tip of a tool, such as screwdriver or bit, inserted in the socket hole of the screw is prevented from falling under its own weight). The concept of such sticking is found in a screw having a cruciform hole as shown in U.S. Pat. No. 2,474,994 and JIS (Japanese Industrial Standards) B1012. However, such cruciform hole is complicated in shape, and Cruciform Hole Nos. 3 and upwards approach the processable limit and cannot be used where torque is required. Further, in the case of the hexagon, since the required accuracy cannot be imparted to the hexagonal socket hole 1' and the hexagonal wrench or hexagonal bit, there is a disadvantage that the hexagonal socket hole 1' has to be made larger than is necessary. The square socket hole 1' has a disadvantage that, as shown in FIG. 3, in the shape of the final product, the screw head 2' is not of true circle because of the available thickness of material or the processable limit, resulting in cracks 22 at corners of the socket hole 1'. Moreover, there has been a danger that the hardening or carburizing of said screw causes hardening cracks, so that the screw often breaks during tightening.

Further, as found in Swiss Pat. No. 250449 and U.S. Pat. No. 3,604,305, there is a known arrangement, as shown in FIG. 4, wherein a socket hole 1' is in the form of two regular squares placed one upon the other with a phase shift of 45°, providing a tightening angle of 45°. This arrangement, however, has a disadvantage that since the vertices of the 8 convex regions 6' projecting toward the center are pointed at an angle of 135°, they can easily chip off. Another disadvantage is that the dimension a between the convex regions 6' and the concave regions 7' is so large that the deformation involved in forming the socket hole 1' influences the contour to the extent that the contour of the screw head fails to assume a true circle. A further disadvantage is that since, with the vertices of the convex and concave regions of the socket hole 1' being 135° and 90°, respectively, a square wrench or square bit having a regular square cross-section will be snugly fitted in the socket hole 1', it is difficult to insert the tip of such square wrench or square bit into the socket hole 1', thus detracting from operating performance.

The present invention has been accomplished with the above points in mind. A first object of the invention is to provide a screw designed so that the angle of the vertices of the convex regions projecting toward the center is at least 135° to assure that the vertices of the convex regions will not chip off during formation and use. A second object of the invention is to provide a screw designed so that the dimension between the vertices of the convex regions and the vertices of the concave regions is sufficiently small to assure that the contour of the screw head will not deform during the formation of the socket hole. A third object of the invention is to provide a screw designed so that the angle of the vertices of the convex regions of the socket hole is at least 135° while the angle of the vertices of the concave regions is at least 90°, so as to facilitate the fitting of a screwdriver or bit in the socket hole, thus providing improved operating performance. A fourth object of the invention is to provide a screw forming tool which is capable of easily forming star-shaped socket holes and mass-producing uniform articles.

The invention will now be described in more detail with reference to the accompanying drawings illustrating embodiments thereof.

FIGS. 10 through 16 are perspective views of other embodiments of the invention;

FIG. 17 is a perspective view of a screwdriver for tightening the screws shown in these figures;

FIG. 18 is a perspective view of an air tool for tightening the screws shown in these figures;

Figure 20A:
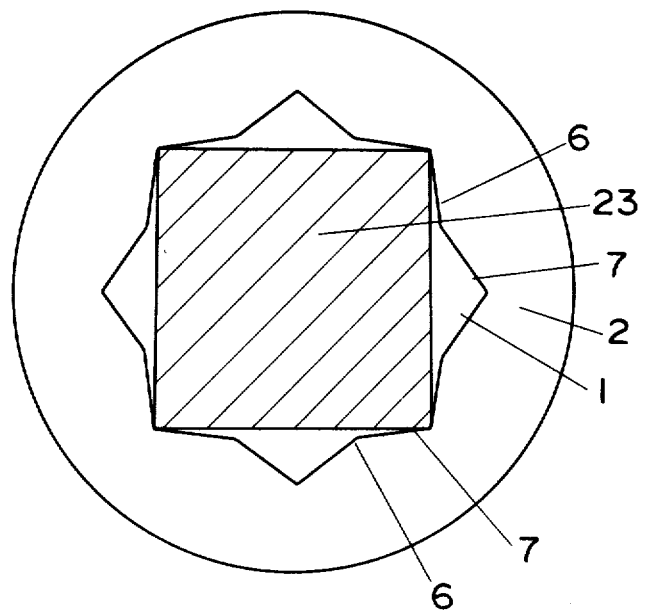
Figure 20B:
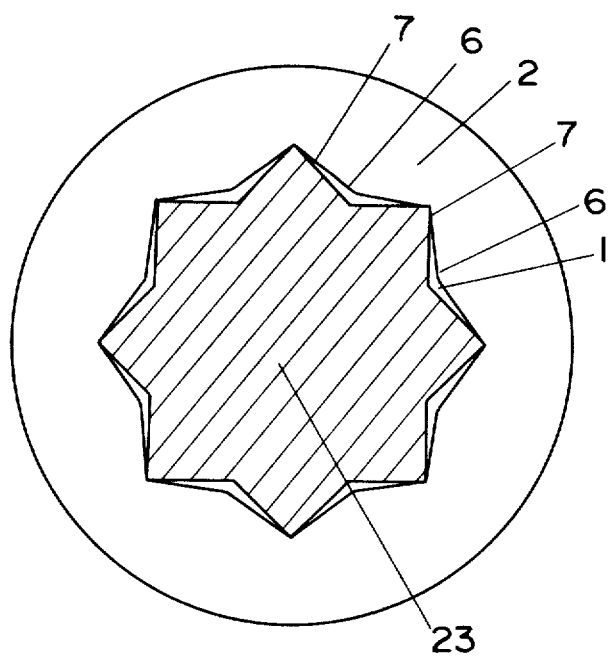
Figure 21:
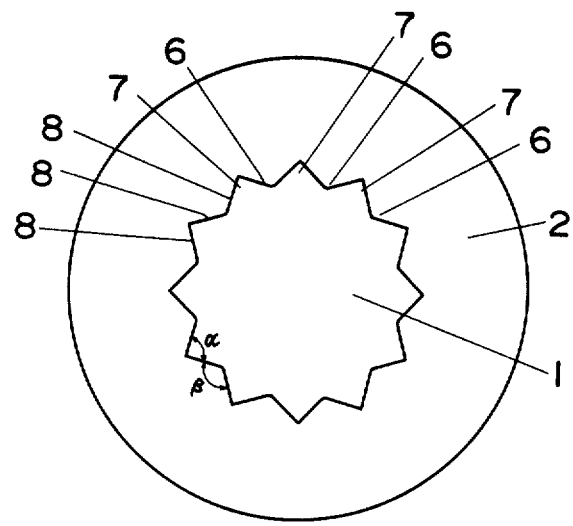
Figure 22:
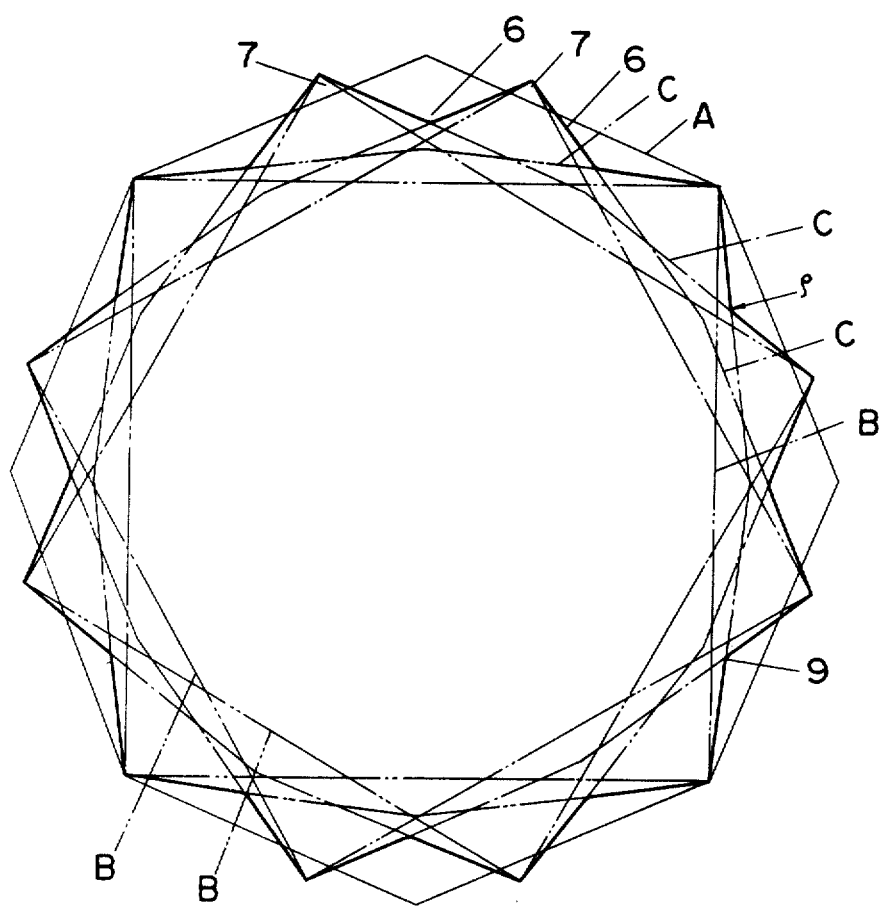
Figure 23:
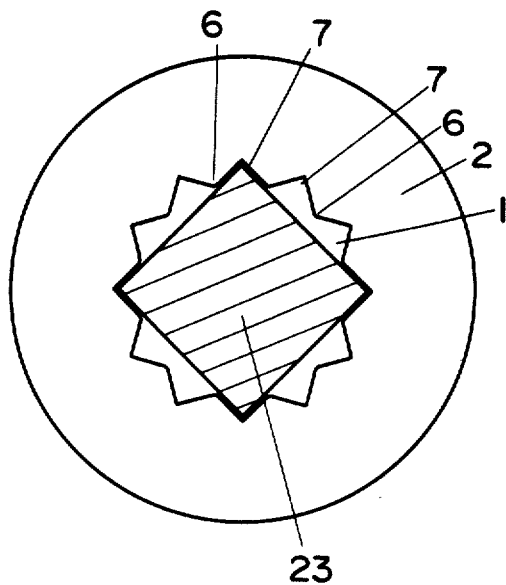
Figure 24:
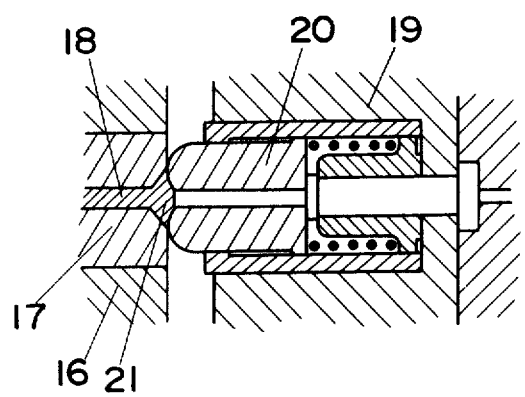
Figure 25:
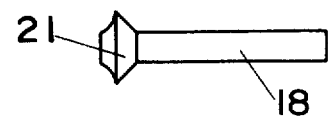
Figure 26A:
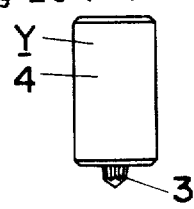
Figure 26B:
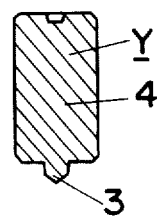
Figure 26C:
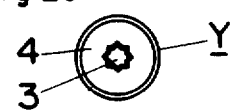
Figure 27A:
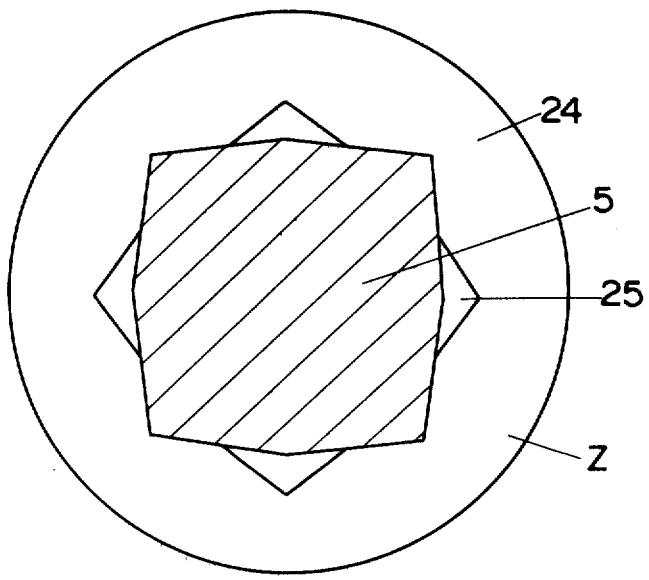
Figure 27B:
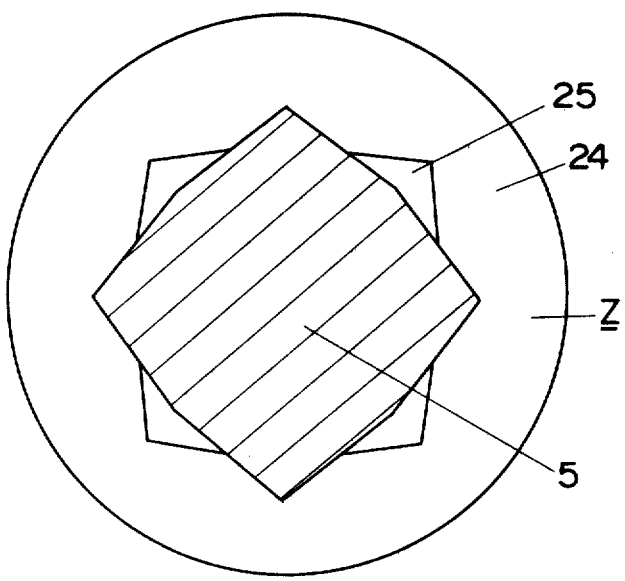

FIGS. 19 (a) and (b) are sectional views showing the cross-sectional shape of the fitting portion at the tip of a screwdriver or bit;

FIGS. 20 (a) and (b) are sectional views showing a fitting portion fitted in a socket hole;

FIG. 21 is a plan view of a screw head according to another embodiment of the invention;

FIG. 22 is an explanatory view for explanation of the shape of the socket hole shown in FIG. 21;

FIG. 23 is a sectional view showing a fitting portion fitted in the socket hole shown in FIG. 21;

FIG. 24 is a sectional view of a form for rough-working the socket hole shown in FIG. 21;

FIG. 25 is a front view of a rough-worked bar;

FIGS. 26 (a), (b) and (c) are a front view, a front sectional view and a bottom view, respectively, of a screw forming tool; and FIGS. 27 (a) and (b) are sectional views showing how a socket hole in the die of a forming jig is shaped by a shaping jig.

Figure 5:
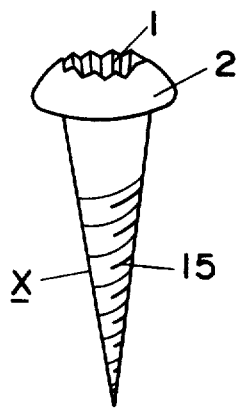
FIG. 5 is a perspective view showing an embodiment of the present invention.
Figure 6:
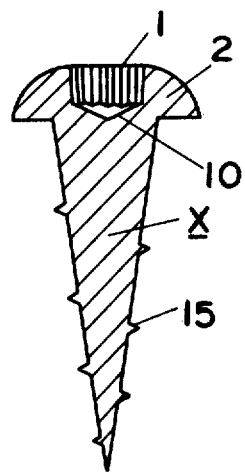
FIG. 6 is a front sectional view of the embodiment shown in FIG. 5.
Figure 7:
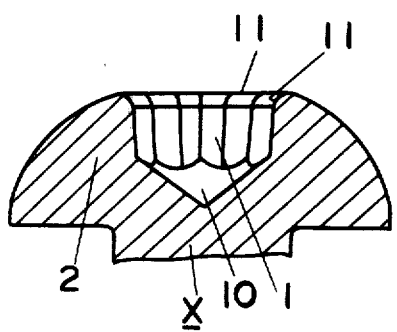
FIG. 7 is an enlarged sectional view of the screw head shown in FIG. 6.
Figure 8:
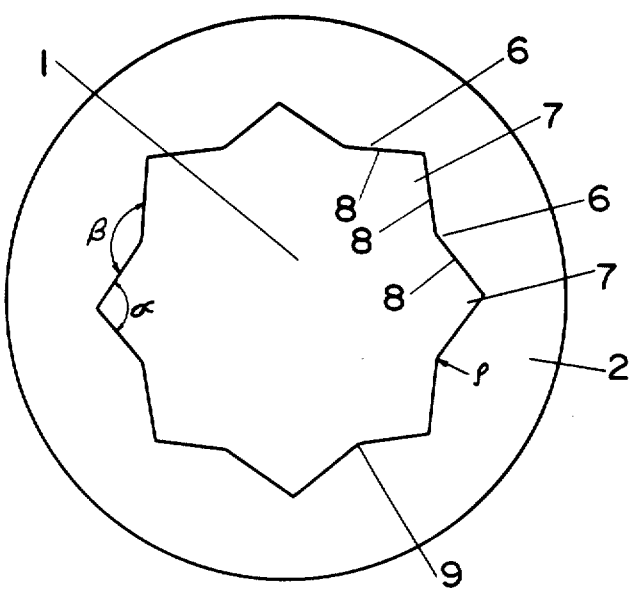
FIG. 8 is an enlarged plan view of said screw head.
Figure 9:
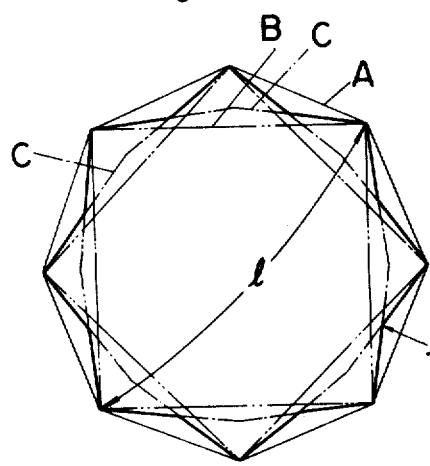
FIG. 9 is an explanatory view for explanation of the shape of the socket hole shown in FIG. 8.

A screw X shown in FIG. 5 is a wood screw comprising a threaded portion 15 in the lower part and a screw head 2 whose top surface is formed with a star-shaped socket hole 1 having eight convex regions 6 and eight concave regions 7, said convex and concave regions alternating with each other. This socket hole 1, as shown in FIG. 9, is in the form of two equilateral octagons C which are interposed between a regular octagon A and a regular square B inscribed in said regular octagon and which are placed one upon the other with a phase shift of 45°, such that the angle B between the adjoining lateral walls 8 of each isosceles triangular convex region 6 is at least 135° and the angle α between the adjoining lateral walls 8 of each isosceles triangular concave region 7 is at least 90°.

Figure 10:
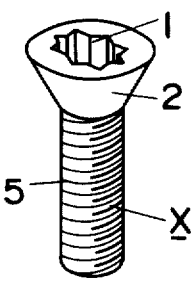
Figure 11:
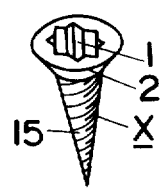
Figure 12:
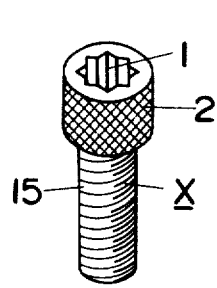
Figure 13:
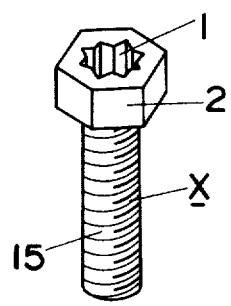
Figure 14:
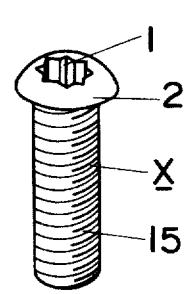

The vertex of each convex region 6 forms an arcuate surface 9 whose radius of curvature is 0.01–0.2 times the length 1 of the diagonal lines of the socket hole 1. The depth of the socket hole 1 is not more than 1.5 times the length 1 of the diagonal lines of the socket hole 1 and the lateral walls of the socket hole 1 have a taper of 6° to 1° so that they are narrowed toward the bottom where an inverted conical space 10 is defined. The upper peripheral edge of the socket hole 1 is formed with a chamfered portion 11 of arcuate cross-section. In an embodiment shown in FIG. 10, the socket hole 1 is formed in the top surface of the screw head 2 of a machine screw. In an embodiment shown in FIG. 11, the socket hole 1 is formed in the top surface of the screw head 2 of a tapping screw. In an embodiment shown in FIG. 12, the socket hole 1 is formed in the top surface of the cylindrical screw head 2 of a knurled head bolt. In an embodiment shown in FIG. 13, the socket hole 1 is formed in the top surface of the screw head 2 of a hexagon headed bolt. In an embodiment shown in FIG. 14, the socket hole 1 is formed in the top surface of the screw head 2 of an oval head screw. In an embodiment shown in FIG. 15, the socket hole 1 is formed in the top surface of the screw head 2 of an oval countersunk screw. In an embodiment shown in FIG. 16, the socket hole 1 is formed in the top surface of the screw head 2 of an oval fillister head screw. Further, the screw X may be a fillister head screw, a pan head screw, a truss head screw, a binding head screw, an oval countersunk head wood screw, an oval head wood screw, an oval fillister head wood screw, a fillister head tapping screw, a pan head tapping screw, a truss head tapping screw, a binding head tapping screw, an oval head tapping screw, a countersunk head tapping screw, an oval countersunk tapping screw, an oval fillister head tapping screw, or the like. The screw X arranged in the manner described above is tightened by a screwdriver 12, as shown in FIG. 17 or by a bit 14 adapted to be attached to a machine, such as an air tool 13, as shown in FIG. 18. The fitting portion 23 of the tool, such as the screwdriver 12 or bit 14, has the form of a regular square prism as shown in FIG. 19 (a) or is star-shaped as shown in FIG. 19 (b). Thus, in the case where the fitting portion 23 has the form of a square prism, it fits in the manner shown in FIG. 20 (a) while if it is star-shaped, it fits in the manner shown in FIG. 20 (b). The screw is tightened by turning the screwdriver 12 or bit 14. In this case, the tightening torque attained is as high as in the case of a square socket hole, and the tightening angle is 45°. Further, since the socket hole 1 is tapered, the fitting portion 23 of the screwdriver 12 or bit 14 sticks to the socket hole 1, allowing the operator to easily carry out even an overhead operation which requires him to keep his face turned upward. Since the angle β of the convex regions 6 of the socket hole 1 is at least 135° and the angle α of the concave regions 7 is at least 90°, it is easy to insert the fitting portion 23 into the socket hole.

FIGS. 21 and 22 show a socket hole 1 according to another embodiment of the invention. The socket hole 1 has the form of three equilateral octagons C which are disposed between a regular octagon A and a regular square B inscribed in said regular octagon A and which are placed one upon another with a phase shift of 30° between two adjacent ones, such that there are 12 convex regions 6 and 12 concave regions 7, said convex and concave regions alternating with each other, the β of the convex regions 6 being at least 135° and the α of the concave regions 7 being at least 90°, the ρ being 1 × 0.01–0.2. In this case, the screw is tightened by fitting the fitting portion 23 in the form of a quadrangular prism of the screwdriver 12 or air tool 13 in the socket hole, as shown in FIG. 23, and turning the same. In this case, the tightening angle is 30°.

When a bar material is used to form the screw X, the following procedure is used. First, as shown in FIG. 24, the shaft portion of a bar material 18 is inserted into the die 17 of a fixed form 16 and the head portion of the bar material 18 is hammered by the rough-working punch 20 of a movable form 19, whereby the head portion of the bar material 18 is formed with a rough-worked head 21, as shown in FIG. 25. A finish-working screw forming tool Y is in the form of a punch 4 whose end face is formed with a socket hole forming projection 3 of the same star-shape as that of the socket hole 1 in the screw X, as shown in FIGS. 26 (a), (b) and (c), said socket hole forming projection 3 having a taper of 6°–1°. The same is used to hammer the rough-worked head 21 of the bar material 18 to form the socket hole 1. The screw forming tool Y is produced in the following manner.

A die 24 is formed with a socket hole 25 of the same star shape as that of the socket hole 1, and a polygonal shaping jig 5 having the same shape as that of the equilateral octagon C is inserted into the socket hole 25 several times with different phases of insertion to shape the socket hole 25, thereby producing a forming jig Z. Such shaping with the shaping jig 5 improves dimensional accuracy. Thereafter, the socket hole 25 in this forming jig Z is copied onto the end face of the punch 4, thus producing the screw forming tool Y having the star-shaped projection 3.

Figure 1:
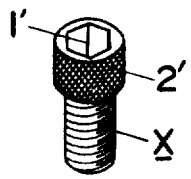
FIG. 1 is a perspective view showing a prior art example.
Figure 2:
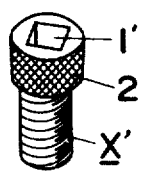
FIG. 2 is a perspective view showing another prior art example.
Figure 4:
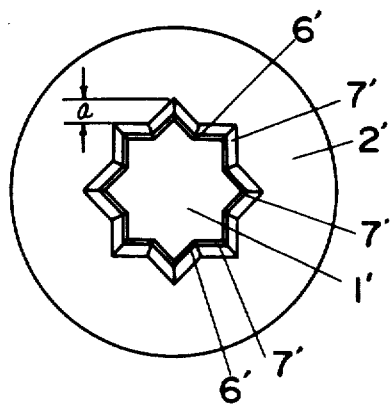
FIG. 4 is a plan view showing a further prior art example.
Figure 3:
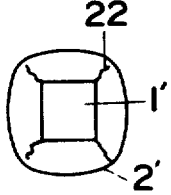
FIG. 3 is a plan view showing a disadvantage of the prior art example shown in FIG. 2.

As has been described so far, according to the present invention, since the star-shaped socket hole is in the form of a plurality of equilateral octagons which are disposed between a regular octagon and a regular square inscribed in said regular octagon and which are placed one upon another in concentric and out-of-phase relation, the angle of the vertices of the convex regions projecting toward the center of the socket hole is at least 135° and there is no danger of the vertices of the convex regions chipping off during formation or use. Moreover, since the angle of the vertices of the convex regions is at least 135° and the angle of the vertices of the concave regions is at least 90°, it is easy to insert the fitting portion of a screwdriver or bit into the socket hole, providing imporved operating performance. Further, since the dimension between the convex and concave regions is small as compared with the conventional one shown in FIG. 4, the contour of the screw head can hardly deform during the formation of the socket hole, so that products whose external dimension is stabilized can be obtained. Further, since the end surface of the punch is formed with a star-shaped projection, a uniform star-shaped socket hole can be formed by simply hammering the screw head with the punch.

What is claimed is:

1. A screw characterized in that the top surface of the screw head is formed with a star-shaped socket hole in the form of two equilateral octagons which are disposed between a regular octagon and a regular square inscribed in said regular octagon and which are placed one upon another in concentric and out-of-phase relation with a phase shift of about 45° so that there are eight convex regions which alternate with eight concave regions.

2. A screw as set forth in claim 1, characterized in that the eight convex regions extending toward the center of the star-shaped socket hole have an amount of projection which is proportional to the diameter of the socket hole, in that the angle formed between the adjoining lateral walls of each convex region is at least 135° and the vertex of each convex region is formed with an arcuate surface having a radius of 0.01–0.2 times the length of the diagonal lines of the socket hole, and in that the angle formed between the adjoining lateral walls of each of the eight concave regions alternating with the eight convex regions is at least 90°.

3. A screw as set forth in any one of claims 1 or 2 characterized in that the inner wall surface of the star-shaped socket hole is tapered at an angle of 6°–1° toward the bottom and the bottom wall has a space for facilitating the insertion of a thing to be fitted in the socket hole.

4. A screw as set forth in any one of claims 1 or 2 characterized in that the depth of the star-shaped socket hole is less than 1.5 times the length of a diagonal line of the socket hole considered from corner-to-corner of the regular square.

5. A screw as set forth in any one of claims 1 or 2 characterized in that the top surface of the screw head and the star-shaped socket hole are connected together by a chamfered portion of arcuate cross-section having a small diameter.

6. A screw forming tool characterized in that it comprises a punch whose end surface is formed with a star-shaped projection in the form of two equilaterial octagons which are disposed between a regular octagon and a regular square inscribed in said regular octagon and which are placed one upon another in concentric and out-of-phase relation with a phase shift of about 45° so that there are eight convex regions which alternate with eight concave regions.

* * * * *